US010560307B2

(12) United States Patent
Narasimhamurthy et al.

(10) Patent No.: US 10,560,307 B2
(45) Date of Patent: Feb. 11, 2020

(54) METHOD AND SYSTEM FOR MANAGEMENT OF AN OPENFLOW AGENT IN OPENFLOW DEVICES

(71) Applicant: Oracle International Corporation, Redwood Shores, CA (US)

(72) Inventors: Giridhar Narasimhamurthy, Bangalore (IN); Sushma Reddy, Gulbarga District (IN)

(73) Assignee: Oracle International Corporation, Redwood Shores, CA (US)

( * ) Notice: Subject to any disclaimer, the term of this patent is extended or adjusted under 35 U.S.C. 154(b) by 930 days.

(21) Appl. No.: 14/571,695

(22) Filed: Dec. 16, 2014

(65) Prior Publication Data

US 2016/0173319 A1 Jun. 16, 2016

(51) Int. Cl.
*H04L 12/24* (2006.01)
*H04L 12/721* (2013.01)

(52) U.S. Cl.
CPC ........ *H04L 41/046* (2013.01); *H04L 41/0803* (2013.01)

(58) Field of Classification Search
CPC ... H04L 41/046; H04L 45/38; H04L 41/0803; H04L 12/24; H04L 12/721; H04L 29/06; H04L 29/08072; H04L 29/08981; H04L 41/0806; H04L 41/12
USPC ........ 709/220, 228; 710/104; 713/1; 717/11; 340/1.1; 370/392
See application file for complete search history.

(56) References Cited

U.S. PATENT DOCUMENTS

| 6,871,346 B1* | 3/2005 | Kumbalimutt | ........ G06F 9/454 718/104 |
| 2002/0147920 A1* | 10/2002 | Mauro | ................ G06Q 20/367 726/26 |

(Continued)

OTHER PUBLICATIONS

HP iLO 3 Scripting and Command Line Guide, Published: Sep. 2013, hereinafter as "NPL document".*

(Continued)

*Primary Examiner* — Wing F Chan
*Assistant Examiner* — Mehulkumar J Shah
(74) *Attorney, Agent, or Firm* — Ferguson, Braswell, Fraser, Kubasta PC

(57) ABSTRACT

A method for managing OpenFlow communications between an OpenFlow Agent and an OpenFlow Controller is disclosed. The method involves extending the command line interface (CLI) based on distributed management task force (DTMF) server management command line protocol (SM CLP) exposed by an integrated Lights Out Management (LOM) software preexisting in enterprise class network equipment to support a plurality of OpenFlow targets, a plurality of verbs, and a plurality of properties, adding a managed element configured to provide handlers for each of the plurality of OpenFlow targets, registering the managed element for the plurality of OpenFlow targets with a manageability access point (MAP) entity, and configuring at least one of the plurality of properties to facilitate communication between an OpenFlow Agent and an OpenFlow Controller within the enterprise class network equipment using the plurality of OpenFlow targets, the plurality of verbs, and the plurality of properties.

17 Claims, 5 Drawing Sheets

(56) References Cited

U.S. PATENT DOCUMENTS

| | | | | |
|---|---|---|---|---|
| 2006/0265468 | A1* | 11/2006 | Iwanski | H04L 63/029 709/217 |
| 2008/0222603 | A1* | 9/2008 | Shaw | G06F 9/45512 717/120 |
| 2013/0117428 | A1* | 5/2013 | Koponen | H04L 41/042 709/223 |
| 2013/0117429 | A1* | 5/2013 | Koponen | H04L 41/00 709/223 |
| 2013/0268686 | A1* | 10/2013 | Wang | H04L 65/1069 709/228 |
| 2014/0188981 | A1* | 7/2014 | Shi | H04L 67/1097 709/203 |
| 2015/0100675 | A1* | 4/2015 | Davie | H04L 45/16 709/223 |
| 2015/0172222 | A1* | 6/2015 | Liao | H04L 49/356 370/392 |
| 2016/0197831 | A1* | 7/2016 | De Foy | H04L 45/7453 370/392 |

OTHER PUBLICATIONS

HP iLO 3 Scripting and Command Line Guide, Published: Sep. 2013, hereinafter as "NPL document" (Year: 2013).*

* cited by examiner

METHOD AND SYSTEM FOR MANAGEMENT OF AN OPENFLOW AGENT IN OPENFLOW DEVICES

BACKGROUND

OpenFlow is a southbound protocol in software defined networking (SDN) architectures. In a classical router or switch (e.g., an Ethernet switch), the fast packet forwarding (data path) and the high level routing decisions (control path) occur on the same device. An OpenFlow switch separates these two functions. The data path portion still resides on the switch, while high-level routing decisions are moved to a separate controller, typically a standard server. The OpenFlow switch and controller communicate via the OpenFlow protocol, which defines messages, such as packet-received, send-packet-out, modify-forwarding-table, and get-stats.

In addition to the OpenFlow controller, OpenFlow architecture includes OpenFlow agents. OpenFlow agents run on network devices, e.g., Ethernet switches. In an OpenFlow based SDN architecture, OpenFlow devices must be managed only by the OpenFlow controller as a "datapath" using a flow based view of traffic, i.e., the switch must not export its own interface for configuration and management. Because the OpenFlow controller does not recognize "flow instructions" for configuring properties of the OpenFlow devices, the properties of an OpenFlow device that would allow an OpenFlow controller to communication with the device are configured using an OpenFlow configuration protocol by a separate configuration agent. Accordingly, the software support for the OpenFlow configuration protocol is deployed and maintained in the switch network fabric.

SUMMARY

In general, in one aspect, the invention relates to a method for managing OpenFlow communications, comprising extending the command line interface (CLI) based on distributed management task force (DTMF) server management command line protocol (SM CLP) exposed by an integrated Lights Out Management (LOM) software preexisting in enterprise class network equipment to support a plurality of OpenFlow targets, a plurality of verbs, and a plurality of properties, adding a managed element configured to provide handlers for each of the plurality of OpenFlow targets, registering the managed element for the plurality of OpenFlow targets with a manageability access point (MAP) entity, and configuring at least one of the plurality of properties to facilitate communication between an OpenFlow Agent and an OpenFlow Controller within the enterprise class network equipment using the plurality of OpenFlow targets, the plurality of verbs, and the plurality of properties.

In general, in one aspect, the invention relates to a system for management of OpenFlow communications, comprising an extended integrated Lights Out Management (LOM) software configured to expose a distributed management task force (DTMF) server management command line protocol (SM CLP) to support a plurality of OpenFlow targets, a plurality of verbs, and a plurality of properties, a manageability access point (MAP) entity configured to facilitate communication between a client and a managed system comprising a registered OpenFlow managed element for configuration of OpenFlow communications between an OpenFlow Controller and an OpenFlow Agent, a transport configured to transport SM CLP commands and responses between the client and MAP entity, and an object manager comprising a management service infrastructure configured to export the handlers for the plurality of OpenFlow targets.

In general, in one aspect, the invention relates to a non-transitory computer readable medium comprising instructions that, when executed by a computer processor, perform a method managing OpenFlow communications comprising extending the command line interface (CLI) based on distributed management task force (DTMF) server management command line protocol (SM CLP) exposed by an integrated Lights Out Management (LOM) software preexisting in enterprise class network equipment to support a plurality of OpenFlow targets, a plurality of verbs, and a plurality of properties, adding a managed element configured to provide handlers for each of the plurality of OpenFlow targets, registering the managed element for the plurality of OpenFlow targets with a manageability access point (MAP) entity, and configuring at least one of the plurality of properties to facilitate communication between an OpenFlow Agent and an OpenFlow Controller within the enterprise class network equipment using the plurality of OpenFlow targets, the plurality of verbs, and the plurality of properties.

Other aspects will be apparent from the following description and the appended claims.

DETAILED DESCRIPTION

Figure 1:
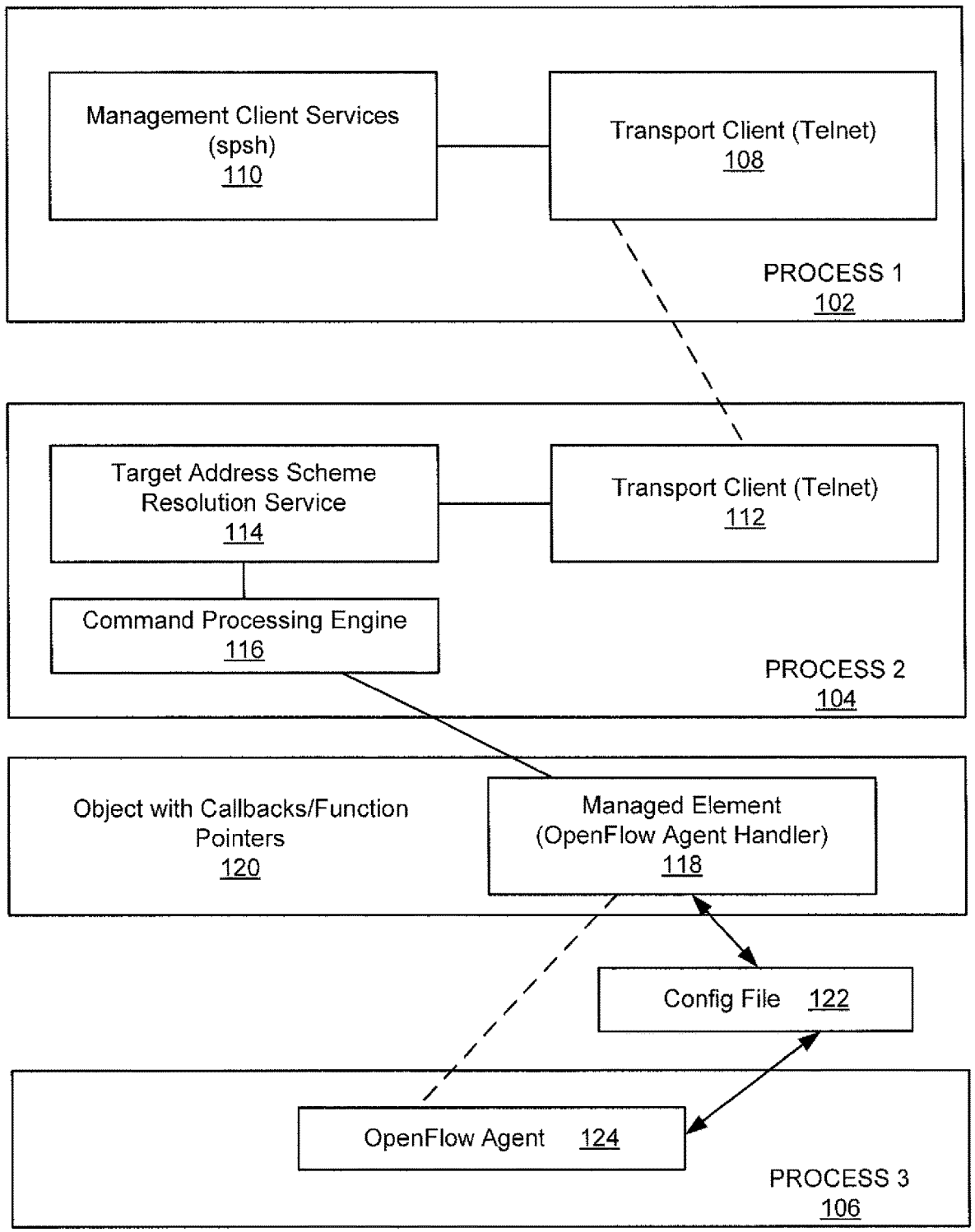
FIG. 1 shows schematic diagrams in accordance with one or more embodiments disclosed herein.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments disclosed herein may be practiced without these specific details. In other instances, well-known features have not been described in detail to avoid unnecessarily complicating the description.

In general, one or more embodiments disclosed herein provide a method and system for configuring properties of an OpenFlow device. More specifically, embodiments disclosed herein extend software already present in enterprise class network equipment, such as Ethernet switches, to configure essential properties of an OpenFlow device so that an OpenFlow controller is able to communicate with the OpenFlow device.

All enterprise class devices support Lights Out Management (LOM). More specifically, LOM is a dedicated computer system within the network equipment, such as an Ethernet switch. The dedicated computer system of the LOM utility runs a software LOM utility that includes functionality to monitor the switching components, fans, etc. present in the network equipment. For example, an Ethernet switch contains a LOM system having a service processor, memory, storage, etc., along with the Ethernet switch processor. LOM software runs on the LOM service processor and monitors the various components in the network system using one of several methods, e.g., an on-board Ethernet fabric, a I2C bus, a PCI-E fabric, or any other suitable method that may be used to monitor the health of network components.

The LOM utility is built using the Server Management Architecture for Server Hardware (SMASH) model. In the SMASH model, the LOM utility exports an interface for maintenance of the network components. The LOM interface may be a command line interface (CLI) or a browser user interface (BUI). The LOM interface is based on distributed management ask force (DMTF) Server Management Command Line Protocol (SM CLP). Embodiments disclosed herein extend the LOM interface to include capability of programming of OpenFlow device essential properties. In one or more embodiments, such essential properties may include, but are not limited to, programming the OpenFlow controller IP address in the OpenFlow device, programming of the TCP port number in the OpenFlow controller to which the OpenFlow device must connect, and programming of the protocol to be used to communicate with the OpenFlow controller. The protocol used to communicate with the OpenFlow controller may be TCP or TLS. In one or more embodiments, when TLS is used, relevant security certificates and private keys also need to be configured.

FIG. 1 shows a system in accordance with one or more embodiments. Specifically, FIG. 1 shows an example of the SMASH architecture and LOM utility extended components for implementing embodiments disclosed herein. In one or more embodiments of the invention, the LOM utility present in Ethernet devices, for example, presents a DMTF CLI for LOM. Such a utility is a SMASH client that implements SM CLP, which is used to manage OpenFlow devices. Accordingly, FIG. 1 shows three processes that map to the SMASH architecture, and are used to implement the extended SM CLP for LOM. The SMASH CLP Architecture White Paper, Version 1.0.1, Oct. 20, 2006, is incorporated by reference herein in its entirety. Each of the processes and associated components are described in detail below.

In one or more embodiments of the invention, Process 1 (102) in the system of FIG. 1 is a client process that mimics, in part, the functionality of the client in the SMASH architecture, The client process is a logical component that manages a system via a Manageability Access Point (MAP) (see discussion of Process 2 (104), below). Process 1 (102) may run on a management station or other system. The client is responsible for providing an interface to the functionality provided by the MAP in a form consistent with the SM architecture. Accordingly, Process 1 (102) may be a LOM CLI process that implements SM CLP. In one or more embodiments, the LOM CLI process is extended to support CLP target for configuring OpenFlow devices. The LOM CLI process is configured to initiate a session with Process 2 (104) (the MAP), transmit protocol-specific commands to the MAP, and receive protocol-specific responses from the MAP.

In accordance with the SMASH architecture, Process 1 (102) may include management client services (service processor shell (spsh)) (110) and a transport (telnet) client (108). The transport (telnet) client (108) is responsible for reliable transportation of commands and messages from the client to process 2 (104). The telnet client (108) uses loopback IP interface to connect to another process that implements CLP services, as specified in the SMASH CLP architecture model. The spsh (110) exposes the DMTF CLI for OpenFlow configuration. The DMTF CLI follows CLP syntax of <verb>[<options>] [<target>] [<properties>]. The spsh (110) is configured to pass an OpenFlow configuration command in CLP format to Process 2 (104), over the telnet client (108) using SMASH CLP, to telnet client (112) in Process 2 (104). The spsh (110) is also configured to wait for responses from Process 2 (104) for commands that a user executes. The user in this context may be an administrator or management client which interacts with the transport (telnet) client (108) to manage the OpenFlow device configuration. More specifically, the user may be a human or a script interfacing with the telnet client (108).

In one or more embodiments of the invention, Process 2 (104) corresponds to the manageability access point (MAP) process in the SMASH CLP architecture model. The MAP process is a collection of services of a system that provides management in accordance with specifications published under the DMTF server management architecture for server hardware initiative. Process 2 (104) is configured to manage the session between the MAP and the transport client (108) in Process 1 (102). Process 2 (104) implements a telnet server (112), a target address scheme resolution service (114), and a command processing engine (116), where components 114 and 116 are collectively known as a CLP service. The CLP service represents the endpoint of the CLP within process 2 (104). Commands are received by the CLP service and turned into internal operations within process 2 (104). Thus, collectively, the target address scheme resolution service (114) and the CPE (116) are responsible for receiving messages are transmitting responses which are compliant with SM CLP. The telnet server (112) establishes Telnet connections with one or more spsh system processes (110). In one or more embodiments, when OpenFlow configuration CLP commands arrive over the Telnet session from Process 1 (102), the command processing engine (CPE) (116) parses and verifies the incoming CLP command and maps the command to the OpenFlow agent handler/managed element (118). The CPE (116) is also configured to invoke the command handler of the OpenFlow agent handler/managed element (118) and send a CLP response back to spsh (110) vai the telnet session (112, 108). The target address scheme resolution service (114) is configured to discover, enumerate, and determine the address of the OpenFlow agent handler/managed element (118) within the MAP.

In one or more embodiments, the OpenFlow agent handler/managed element (118) is a managed object that is uniquely identified by the target address cheme resolution service (114) for a CLP command. The OpenFlow agent handler/managed element (118) is the finest granularity of addressing which is capable of being the target of commands. The OpenFlow agent handler/managed element (118) is registered for OpenFlow configuration CLP commands. In one or more embodiments, each OpenFlow target has a handler for all the commands supported by that target. The handler is registered with the object manager during OpenFlow agent handler/managed element (118) initialization. Once registered, the handler is invoked by the CLP service. In one or more embodiments, the object (120) with callbacks/function pointers is the managed object that provides function pointers or entry points for the properties it supports. For example, when process 2 (104) receives a command, it calls the handler using the appropriate function pointer provided by object (120).

In one or more embodiments, the configuration file (config file (122)) stores the OpenFlow configuration information that is entered by the user using the DMTF CLI. More specifically, the config file (122) is a form of interprocess communication between the CLP service in the MAP process 2 (104) and the OpenFlow Agent (124). The config file (122) stores the information associated with properties of the OpenFlow agent (124) before the OpenFlow agent uses the config file (122). The config file (122) may have the following format:

server:<controller ip><controller port><protocol>, where "server" is a string that indicates that the attributes that follow in the line are Openflow Controller attributes. The IP, port, and protocol, are properties of the OpenFlow Controller that may configured and stored into the config file (122). The process of configuring these properties is described below in FIG. 3.

Continuing with FIG. 1, in one or more embodiments of the invention, Process 3 (106) is a managed system that implements a collection of managed elements, including the OpenFlow agent (124). Each managed element in the managed system is managed by process 2 (104) (i.e., the MAP process). Those skilled in the art will appreciate that the OpenFlow agent (124) as a managed element may be a host, node, server, etc., and may represent multiple types of systems, such as a stand-alone element, a rack, blade, or virtual system. In one or more embodiments, the OpenFlow agent (124) is extended to receive a POSIX signal, such as SIGUSR signal from process 2 (104), when a user changes the OpenFlow configuration of essential properties. More specifically, the OpenFlow agent (124) reads the new configuration of the properties of the OpenFlow device being managed by process 2 (104) from the config file (122) and takes the necessary action to implement the changes made to the OpenFlow device properties.

The invention is not limited to the processes and components shown in FIG. 1.

Figure 2:
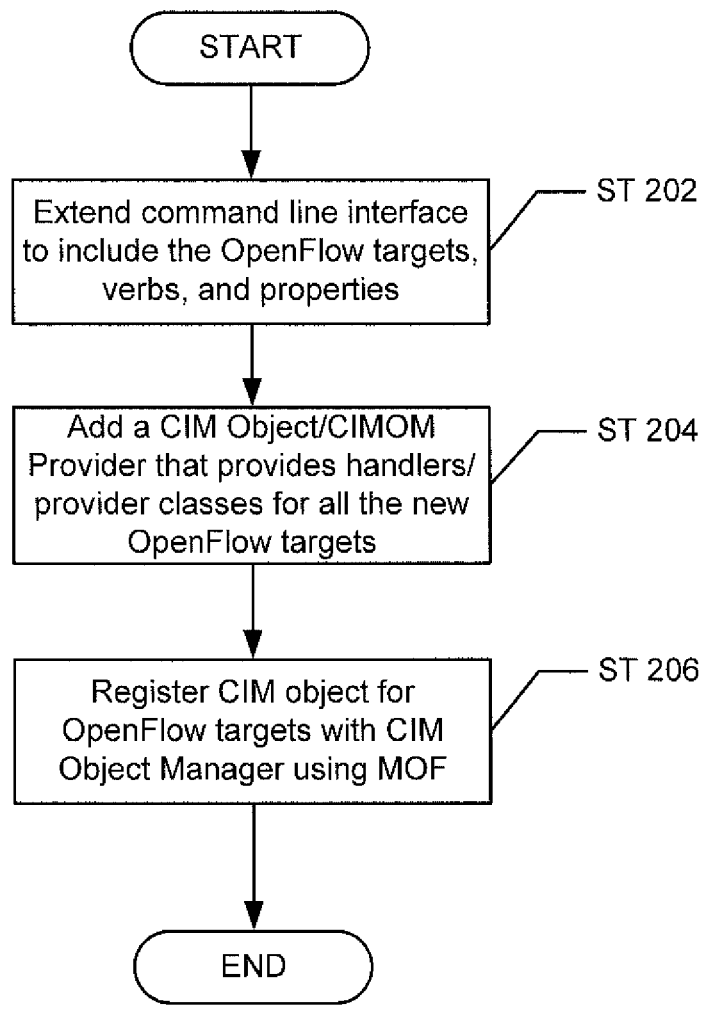
FIGS. 2-3 show flowcharts in accordance with one or more embodiments disclosed herein.

FIG. 2 shows a flow chart for the set up process required to extend the integrated LOM to support configuration of OpenFlow device properties. More specifically, FIG. 2 describes the steps taken to extend the integrated LOM to support OpenFlow configuration directly from the SM CLP. Initially, the LOM CLI process (i.e., the LOM client described as process 1 in FIG. 1 described above) is extended to include the OpenFlow targets, verbs, and properties for configuring an OpenFlow agent (ST 202). More specifically, in one or more embodiments, the LOM CLI entity that implements SM CLP is extended to support the following CLP targets:
    openflow
    openflow/ssl
    openflow/sll/cacert
    openflow/ssl/public_cert
    openflow/ssl/private_key
    openflow/controllerXX The following verbs are supported for each of the new targets mentioned above:
    openflow: cd, show, start, stop, reset
    openflow/ssl: cd, set show
    openflow/ssl/cacert: cd, set show
    openflow/ssl/public_cert: cd, set show
    openflow/ssl/private_key: cd, set show
    openflow/controllerXX: cd, set show Further, the following properties are created for each new target described above:
    openflow: type, status, uptime
    openflow/ssl: type
    openflow/ssl/cacert: type, clear_action, load_uri, issuer, subject, valid_from, valid_until
    openflow/ssl/public_cert: type, clear_action, load_uri, issuer, subject, valid_from, valid_until
    openflow/ssl/private_key: type, clear_action, key_present, load_uri
    openflow/controllerXX: type, address, port, protocol Those skilled in the art will appreciate that the targets, verbs, and properties are not limited to those described above. More specifically, in one or more embodiments of the invention ST 202 may involve displaying the following namespace tree in the DTMF CLI of the LOM interface/management software of the network equipment.

Each node of the above namespace tree is a target of OpenFlow CLP commands. The verbs and properties described above are also added for each target at this stage. Continuing with FIG. 2, next, a managed element is created for OpenFlow agent. More specifically, a CIM object/CIMOM provider that provides handlers/provider classes for all the new OpenFlow targets and properties is added (ST 204). In one or more embodiments of the invention, the CIM object/CIMOM exports the Instance and Property function classes for the Openflow Agent object, as a Shared Object Library (SOL) or a dynamically Linked Library (DLL). In ST 204, the following functions in the function classes may be implemented:
    enumerateInstances( )
    getProperty( )
    setProperty( )

Example mapping of CLP commands to CIM Operations for Openflow:

TABLE 1

| CLP | CIM Class Function/Function Handler |
| --- | --- |
| cd | enumerateInstances( ) |
| set | setProperty( ) |
| get | getProperty( ) |

After ST 204, all commands for targets under "openflow" are resolved to The CIM managed object. As the final step in the set up process of FIG. 2, in ST 206, the CIM object is registered with the MAP for OpenFlow targets with the CIM object manager (CIMOM) using Managed Object Format (MOF). MOF is a language used to describe managed objects and associated properties. To inform a CIMOM about a new managed object, a MOF is created which CIMOM then uses to update its object tree during the CIMOM's initialization. More specifically, registration of the OpenFlow agent object tree with the CIMOM results in the CIMOM using MOF to add the "openflow" object tree into tits larger object tree. In one or more embodiments of the invention, as part of ST 206, CIMOM parses the MOF file, converts the classes and instances into C structures/function pointers or Java/C++ classes, and adds these to the object tree/object manager repository.

After the setup process of FIG. 2 is performed, when a command for an object in the openflow object tree arrives at the CIMOM, the CIMOM loads the OpenFlow provider SOL/DLL. Then, the CIMOM calls the command handlers in the object's Instance or Property function class. Various CLP commands map to the CIM Operations as shown in Table 1 above. The object's handler communicates with the OpenFlow Agent process as described in FIG. 1 to process the command, which is described further in FIG. 3 below.

The invention is not limited to the processes described in FIG. 2.

Figure 3:
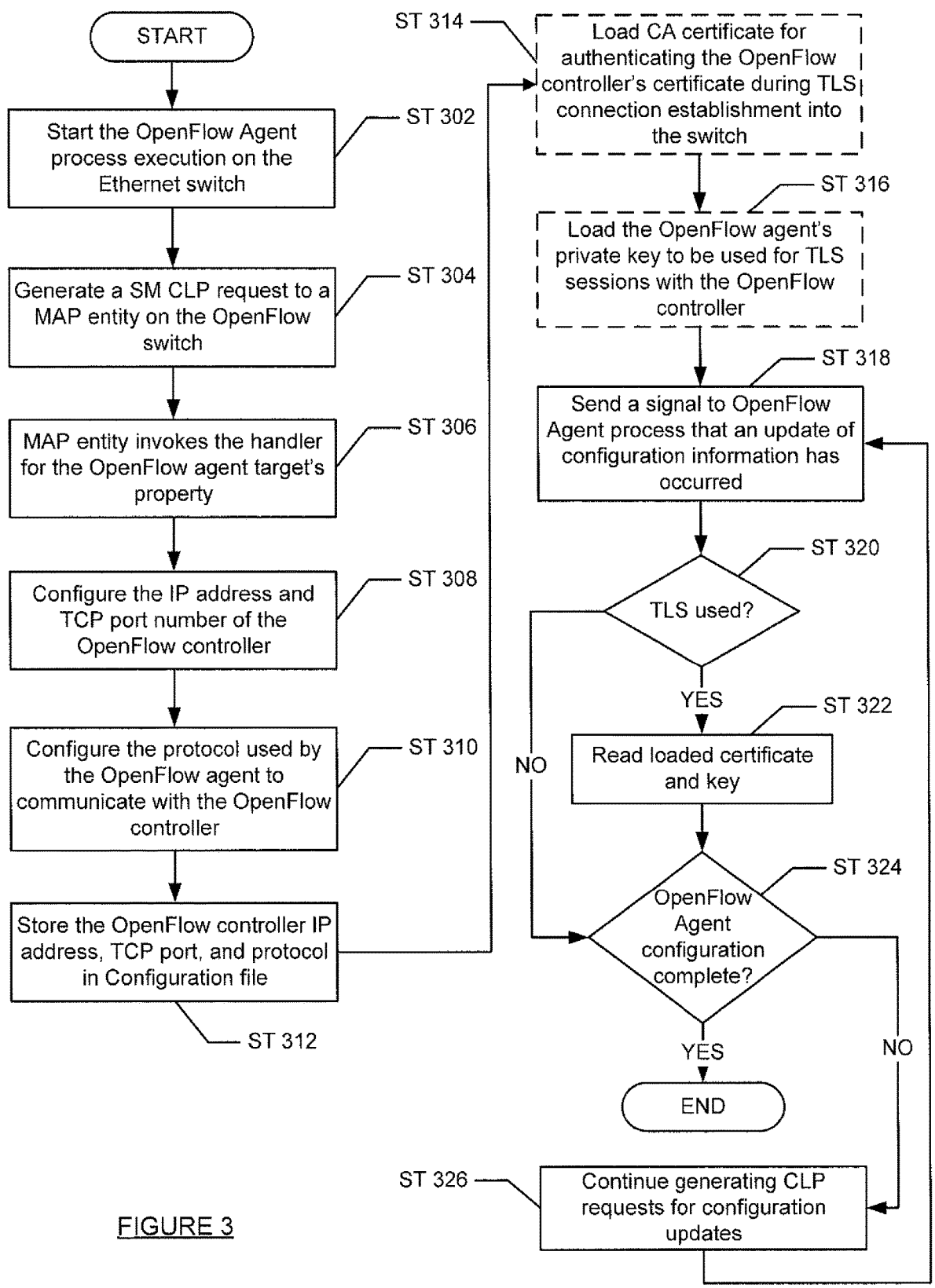

FIG. 3 shows the process for using the extended OpenFlow targets and properties in accordance with one or more embodiments of the invention. Initially, the the OpenFlow Agent process execution is started on the Ethernet switch or other network equipment (ST 302). In one or more embodiments of the invention, ST 302 may be performed by using the "start" verb on the "openflow" target on the CLI. Those of ordinary skill in the art will appreciate that there may also be a "stop" verb on the "openflow" target to stop the OpenFlow agent process on the switch. A verb/command on the "openflow" target, or any other extended target for managing the OpenFlow Agent, generates a SM CLP request to the MAP entity on the OpenFlow switch (ST 304). Next, the MAP invokes the handler for the OpenFlow Agent target's property, provided by the target's CIM object handler (ST 306).

At this stage a variety of verbs/commands may be used to configure the properties of the OpenFlow Agent. ST 308-322 describe some examples of commands that may be used to configure the OpenFlow Agent. For example, in ST. 308, the IP address and the TCP port number of the OpenFlow controller may be configured. In one or more embodiments of the invention, to configure the IP address of the OpenFlow controller, the "set" verb may be used on "openflow/controllerXX" target's "address" property. To configure the TCP port of the OpenFlow controller, the "set" verb may be used on the "openflow/controllerXX" target's "port" property.

In ST 310, the protocol used by the OpenFlow agent to communicated with the OpenFlow controller may be configured. Specifically, in one or more embodiments of the invention, the "set" verb is used on the "openflow/controllerXX" target's "protocol" property to configure the protocol. In one or more embodiments of the invention, the protocol specified in the "set" command may be TCP (transmission control protocol) or TLS (transport layer security). In one or more embodiments, execution of the above commands to set the IP address, TCP port number, and protocol results in the managed element handler for "openflow/controllerXX" target updating the configuration file with the "address" value, the "port" value, and the "protocol value" provided by the user from the SM CLP client in the "set" commands (ST 312). Thus, in ST 312, the OpenFlow controller properties specified by the user may be stored in the configuration file. Example entries in the configuration file may be:

| | | |
|---|---|---|
| server: 10.134.172.140 | 9999 | tcp |
| server: 10.134.172.140 | 6633 | tls |

In one or more embodiments of the invention, if the protocol specified by the user in ST 310 is TLS, associated certificates must be loaded. TLS uses X.509 certificates, and thus, asymmetric cryptography to authenticate the counterparty with whom they are communicating, and also exchanges a symmetric key with the counterparty. Accordingly, in ST 314, commands to load certificate authority (CA) certificates for authentication of the OpenFlow controller's certificate during TLS connection establishment into the switch are performed. Specifically, the "set" verb may be used on the "openflow/ssl/cacert" target's "load_uri" property to load the CA certificate used for authenticating the controller's certificate during TLS connection establishment into the Ethernet switch. The "set" verb on "openflow/ssl/cacert" target's "clear_action" property deletes the CA Certificate for the OpenFlow controller that is present in the switch. Further, in one or more embodiments, the "set" verb on "openflow/ssl/public_cert" target's "load_uri" property loads the public certificate of the OpenFlow Agent which communicates with the OpenFLow Controller. The same verb and target's "clear_action" property similarly deletes the public certificate of the OpenFlow Agent that is present in the switch. Next, in ST 316, the OpenFlow agent's private key to be used for TLS session with the OpenFlow controller is loaded. The "set" verb on "openflow/ssl/private_key" target's "load_uri" property loads the OpenFlow Agent's private key to be used for TLS sessions with the controller. The same verb and target's "clear_action" property similarly deletes the private key loaded in the switch for OpenFlow sessions, Those of ordinary skill in the art will appreciate that protocols such as ftp, http, scp, etc. May be used to load CA Certificates, public certificates, and keys into the switch from a PKI.

In ST 318, a signal is sent the OpenFlow Agent process that an update of the configuration information has occurred. Specifically, in one or more embodiments of the invention, the "reset" verb on the "openflow" target sends a POSIX signal to the OpenFlow Agent process that an update of configuration information has occurred. The POSIX signal may be a SIGUSR signal from the CLP service process. The POSIX signal handler in the OpenFlow Agent reads the configuration file updated in ST 312. If TLS is used (ST 320), the handler reads certificates and the key loaded in STs 314-316. IF TLS is not used, or after the certificates and key are read by the POSIX signal handler, a determination is made as to whether the OpenFlow agent configuration is complete (ST 324). If more configurations are necessary, the process continues to generate CLP requests for configuration updates (ST 326) and some of the steps described in FIG. 3 may be repeated. If configuration is complete (ST 324), then the process ends.

Those skilled in the art will appreciate that variations of the configurations for multiple OpenFlow controllers may be implemented without deviating from embodiments of the invention. For example, instead of a single CA Certificate for a single OpenFlow controller, a per controller CA Certificate may be assigned by creating a target such as openflow/controllerXX/ssl/cacert. This allows for multiple controller to be configured for an OpenFlow Agent, each certified by a different CA.

The invention is not limited to the processes described in FIG. 3. Further, those of ordinary skill in the art will appreciate that although the discussion above focuses on configuring an OpenFlow Controller and OpenFlow Agent properties in Ethernet switches, embodiments of the invention are equally applicable to other network equipment that may already have LOM installed thereon. For example, embodiments of the invention may also be applicable to Middlexboxes such as load balancers, firewalls, etc. that are Openflow based.

The following examples illustrate CLPs and the targets visible in the Service Propcessor Shell (SPSH) in a particular type of Ethernet switch (i.e., an Opus Ethernet Switch):

```
-> show /NEM/openflow/
    /NEM/openflow
    Targets:
        controller1
        controller2
        ssl
    Properties:
        type = OpenFlow Fabric Switch
        status = disabled
        uptime = none
```

```
Commands:
    cd
    show
    start
    stop
-> show /NEM/openflow/controller1
    /NEM/openflow/controller1
    Targets:
    Properties:
        type = OpenFlow Controller
        address = 10.134.172.140
        port = 9999
        protocol = tcp
    Commands:
        cd
        set
        show
-> show /NEM/openflow/controller2
    /NEM/openflow/controller2
    Targets:
    Properties:
        type = OpenFlow Controller
        address = 10.134.172.140
        port = 6633 protocol = tcp
    Commands:
        cd
        set
        show
-> show /NEM/openflow/ssl/
    /NEM/openflow/ssl
    Targets:
        ca_cert
        public_cert
        private_key
    Properties:
        type = OpenFlow SSL Settings
    Commands:
        cd
        set
        show
-> show /NEM/openflow/ssl/ca_cert/
    /NEM/openflow/ssl/ca_cert
    Targets:
    Properties:
        type = OpenFlow Controller SSL CA Certificate Settings
        clear_action = (Cannot show property)
        load_uri = (Cannot show property)
        issuer = (none)
        subject = (none)
        valid_from = (none)
        valid_until = (none)
    Commands:
        cd
        set
        show
-> show /NEM/openflow/ssl/public_cert/
    /NEM/openflow/ssl/public_cert
    Targets:
    Properties:
        type = OpenFlow SSL Certificate Settings
        clear_action = (Cannot show property)
        load_uri = (Cannot show property)
        issuer = /C=US/ST=California/L=RedwoodShores/O=Oracle
                America, Inc./CN=Oracle Integrated Lights
                Out Manager
        subject = /C=US/ST=California/L=Redwood Shores/
                O=Oracle America, Inc./CN=Oracle Integrated Lights
                Out Manager
        valid_from = Jul 1 19:53:05 2010 GMT
        valid_until = Jun 26 19:53:05 2030 GMT
    Commands:
        cd
        set
        show
-> show /NEM/openflow/ssl/private_key/
    /NEM/openflow/ssl/private_key
    Targets:
    Properties:
        type = OpenFlow SSL Private Key Settings
        clear_action = (Cannot show property)
        key_present = true
        load_uri = (Cannot show property)
    Commands:
        cd
        set
        show
```

Figure 4:
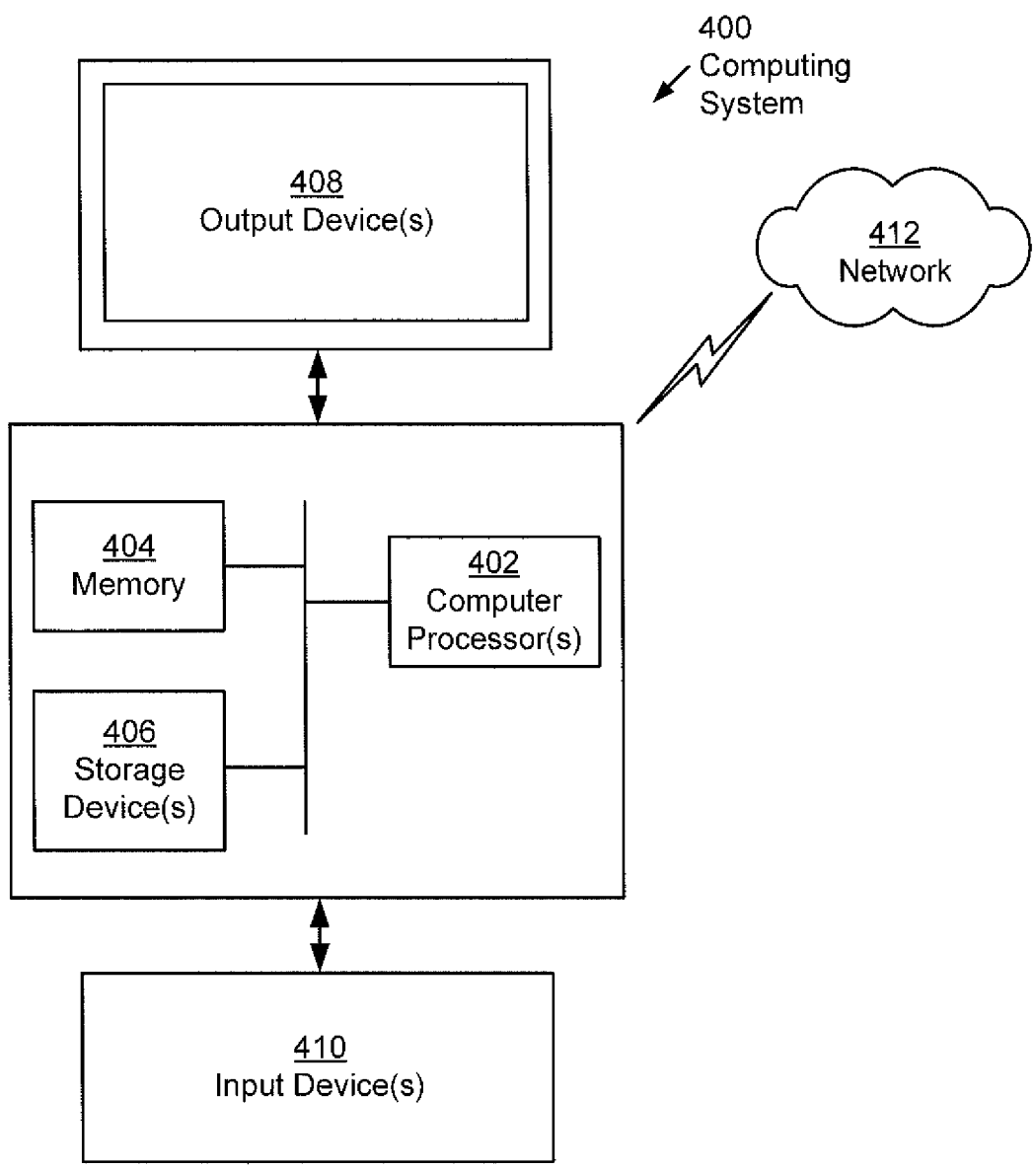
FIG. 4 shows a computer system in accordance with one or more embodiments disclosed herein.
Figure 5:
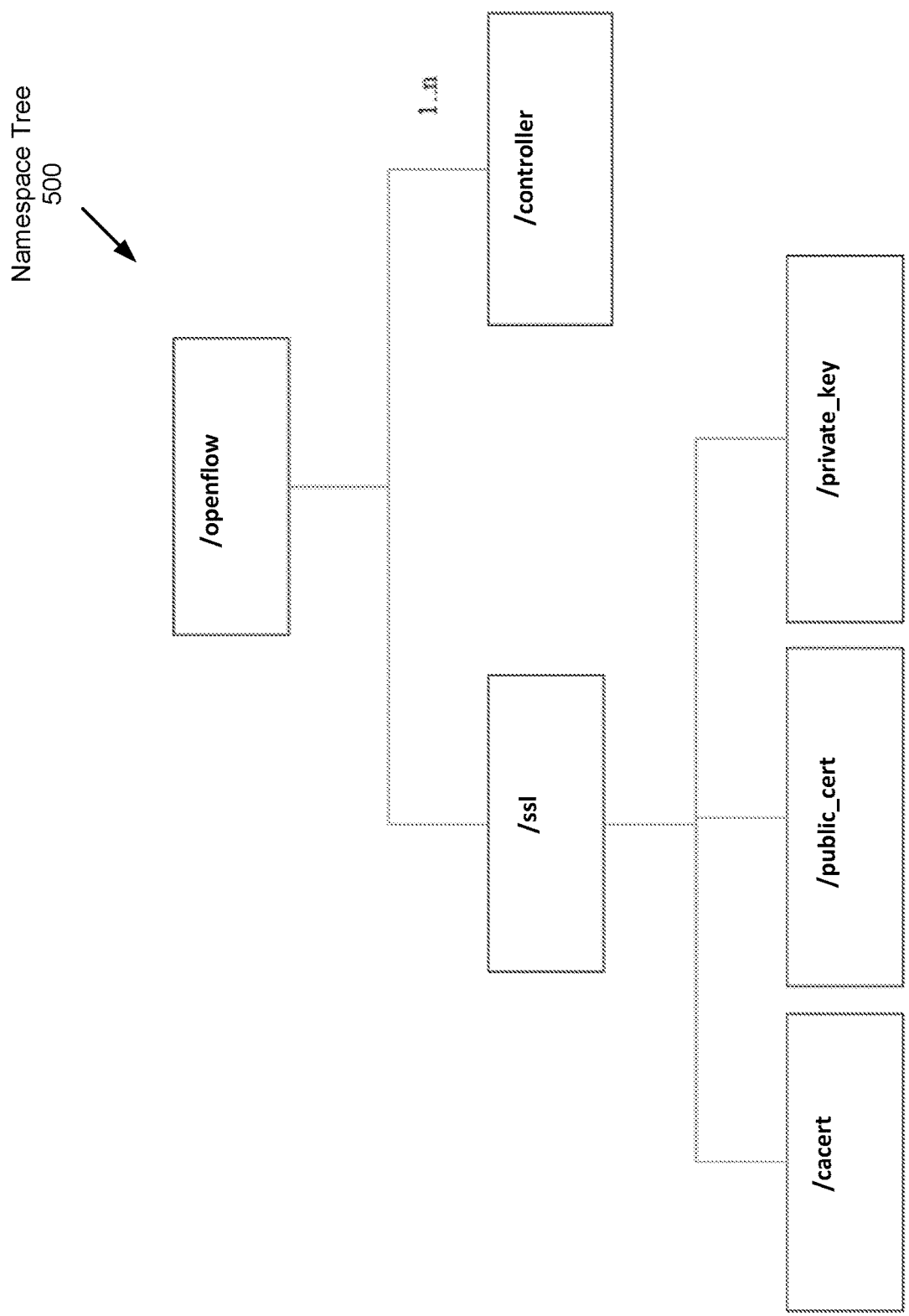

One or more embodiments disclosed herein may be implemented on virtually any type of computing system regardless of the platform being used. Specifically, one or more components described in FIG. 1, e.g., the LOM utility, may be implemented on any type of computing system. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions.

For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments disclosed herein.

One or more elements of the aforementioned computing system (400) may be located at a remote location and connected to the other elements over a network (412). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

One or more embodiments disclosed herein may enable simplification of management software used in OpenFlow switches. That is, because programming of essential properties is less frequent than programming of flow tables, embodiments disclosed herein eliminate the need for deploying and maintaining a full-blown OF-Config based software in network enterprise equipment. Only the OpenFlow device is added to a switch, for example, instead of also adding the OF-Config configuration components, thereby simplifying the maintenance of such OpenFlow switches, The deployment of OpenFlow based SDN architecture is an existing data center is also simplified, where only the traditional switching software is disabled and replaced by OpenFlow device software. Further, because LOM interface/software is found in all enterprise class network equipment, and is extended for purposes of configuration of OpenFlow devices, no new software component is added to the enterprise network equipment.

While the invention has been described with respect to a limited number of embodiments, those skilled in the art, having benefit of this disclosure, will appreciate that other embodiments can be devised which do not depart from the scope of embodiments as disclosed herein. Accordingly, the scope of embodiments disclosed herein should be limited only by the attached claims.

What is claimed is:

1. A method for managing OpenFlow communications, comprising:
   extending command line interface (CLI) based on distributed management task force (DTMF) server management command line protocol (SM CLP) exposed by an integrated Lights Out Management (LOM) software preexisting in enterprise class network equipment to support a plurality of OpenFlow targets, a plurality of verbs, and a plurality of properties;
   adding a managed element configured to provide handlers for each of the plurality of OpenFlow targets;
   registering the managed element for the plurality of OpenFlow targets with a manageability access point (MAP) entity;
   configuring at least one of the plurality of properties to facilitate communication between an OpenFlow Agent and a first OpenFlow Controller within the enterprise class network equipment using the plurality of OpenFlow targets, the plurality of verbs, and the plurality of properties,
   wherein configuring, by the integrated LOM software and via the CLI, at least one of the plurality of properties comprises:
      configuring an IP address of the first OpenFlow Controller;
      configuring a TCP port of the first OpenFlow Controller; and
      configuring a protocol using which the OpenFlow Agent and the first OpenFlow Controller communicate;
   configuring at least one of the plurality of properties to facilitate communication between the OpenFlow Agent and a second OpenFlow Controller within the enterprise class network equipment using the plurality of OpenFlow targets, the plurality of verbs, and the plurality of properties;
   loading a first certificate authority (CA) certificate for the first OpenFlow Controller;
   loading a second CA certificate for the second OpenFlow Controller;
   storing values for the IP address, the TCP port, and the protocol in a configuration file;
   receiving a signal when an OpenFlow configuration is changed by a user;
   reading the configuration file; and
   in response to determining that the OpenFlow configuration is incomplete, sending, to the user and via the CLI, a request for a configuration update.

2. The method of claim 1, wherein the enterprise class network equipment is an Ethernet switch, and wherein the OpenFlow Agent and the first OpenFlow controller reside in the Ethernet switch.

3. The method of claim 1, wherein the
   values are stored before the OpenFlow Agent uses the configured information.

4. The method of claim 3, wherein registration of the managed element is performing using managed object format (MOF), wherein the managed element uses the MOF to update its object tree during initialization of the managed element.

5. The method of claim 4, wherein the managed element is a common information model (CIM) object, and wherein the CIM object exports the Instance and Property function classes for the OpenFlow Agent as a shared object library (SOL) or a dynamically linked library (DLL).

6. The method of claim 3, wherein
   the configuration file is read to perform operations that comply with the changed configuration of the OpenFlow communications.

7. The method of claim 2, wherein when the protocol is transport layer security (TLS), the method further comprises:
   loading a public certificate for the OpenFlow Agent;
   loading a first private key for the first OpenFlow Controller; and
   loading a second private key for the second OpenFlow Controller.

8. A system for management of OpenFlow communications, comprising:
   an extended integrated Lights Out Management (LOM) software configured to expose a distributed management task force (DTMF) server management command line protocol (SM CLP) to support a plurality of OpenFlow targets, a plurality of verbs, and a plurality of properties;
   a manageability access point (MAP) entity configured to facilitate communication between a client and a managed system comprising a registered OpenFlow managed element for configuration of OpenFlow communications between:
   a first OpenFlow Controller and an OpenFlow Agent, and
   a second OpenFlow Controller and the OpenFlow Agent;
   a transport configured to transport SM CLP commands and responses between the client and MAP entity;

an object manager comprising a management service infrastructure configured to export the handlers for the plurality of OpenFlow targets, wherein the SM CLP commands are used to configure, by the integrated LOM software and via the CLI, the plurality of properties comprising:
an IP address of the first OpenFlow Controller;
a TCP port of the first OpenFlow Controller; and
a protocol using which the OpenFlow Agent and the first OpenFlow Controller communicate;

a configuration file configured to store a plurality of values for the plurality of properties when configuring the OpenFlow communications; and the OpenFlow agent configured to:
load a first certificate authority (CA) certificate for the first OpenFlow Controller;
load a second CA certificate for the second OpenFlow Controller;
receive a signal when an OpenFlow configuration is changed by a user;
reads the configuration file; and
in response to determining that the OpenFlow configuration is incomplete, send, to the user, a request for a configuration update.

9. The system of claim 8, wherein the system architecture is based on Server Management Architecture for Server Hardware (SMASH), and wherein the MAP entity provides management in accordance with specifications published under a DMTF SMASH initiative.

10. The system of claim 8, wherein the registered OpenFlow managed element is a common information model (CIM) managed object that is uniquely identified by a target address scheme resolution service associated with the MAP entity.

11. The system of claim 8, wherein the MAP entity comprises a command processor engine configured to verify the SM CLP commands, map the CLP commands to the OpenFlow managed element, and invoke a command handler of the OpenFlow managed element.

12. The system of claim 11, wherein the plurality of values are stored in the configuration file before the OpenFlow Agent uses information stored in the configuration file.

13. The system of claim 12, wherein the configuration file is read to determine changed values for the plurality of properties.

14. A non-transitory computer readable medium comprising instructions that, when executed by a computer processor, perform a method managing OpenFlow communications comprising:
extending a command line interface (CLI) based on distributed management task force (DTMF) server management command line protocol (SM CLP) exposed by an integrated Lights Out Management (LOM) software preexisting in enterprise class network equipment to support a plurality of OpenFlow targets, a plurality of verbs, and a plurality of properties;

adding a managed element configured to provide handlers for each of the plurality of OpenFlow targets;
registering the managed element for the plurality of OpenFlow targets with a manageability access point (MAP) entity;
configuring at least one of the plurality of properties to facilitate communication between an OpenFlow Agent and a first OpenFlow Controller within the enterprise class network equipment using the plurality of OpenFlow targets, the plurality of verbs, and the plurality of properties,
wherein configuring, by the integrated LOM software and via the CLI, at least one of the plurality of properties comprises:
configuring an IP address of the first OpenFlow Controller;
configuring a TCP port of the first OpenFlow Controller; and
configuring a protocol using which the OpenFlow Agent and the first OpenFlow Controller communicate;
configuring at least one of the plurality of properties to facilitate communication between the OpenFlow Agent and a second OpenFlow Controller within the enterprise class network equipment using the plurality of OpenFlow targets, the plurality of verbs, and the plurality of properties;
loading a first certificate authority (CA) certificate for the first OpenFlow Controller;
loading a second CA certificate for the second OpenFlow Controller;
storing values for the IP address, the TCP port, and the protocol in a configuration file;
receiving a signal when an OpenFlow configuration is changed by a user;
reading the configuration file; and
in response to determining that the OpenFlow configuration is incomplete, sending, to the user and via the CLI, a request for a configuration update.

15. The non-transitory computer readable medium of claim 14, wherein the values are stored before the OpenFlow Agent uses the configured information.

16. The non-transitory computer readable medium of claim 15,
wherein the configuration file is read to perform operations that comply with the changed configuration of the OpenFlow communications.

17. The non-transitory computer readable medium of claim 14, wherein when the protocol is transport layer security (TLS), the method further comprises:
loading a public certificate for the OpenFlow Agent;
loading a first private key for the first OpenFlow Controller; and
loading a second private key for the second OpenFlow Controller.

* * * * *

UNITED STATES PATENT AND TRADEMARK OFFICE
CERTIFICATE OF CORRECTION

| | | |
|---|---|---|
| PATENT NO. | : 10,560,307 B2 | Page 1 of 1 |
| APPLICATION NO. | : 14/571695 | |
| DATED | : February 11, 2020 | |
| INVENTOR(S) | : Giridhar Narasimhamurthy et al. | |

It is certified that error appears in the above-identified patent and that said Letters Patent is hereby corrected as shown below:

On the Title Page

Item (57) ABSTRACT, occurring on the fifth line of the abstract, "(DTMF)" should read -- (DMTF) --.

In the Claims

Claim 1, Column 11, Line 44, "(DTMF)" should read -- (DMTF) --.

Claim 1, Column 12, Line 1, the word "using" should read -- with --.

Claim 4, Column 12, Line 30, the word "performing" should read -- performed --.

Claim 8, Column 12, Line 55, "(DTMF)" should read -- (DMTF) --.

Claim 8, Column 13, Line 9, the word "using" should read -- with --.

Claim 14, Column 13, Line 51, "(DTMF)" should read -- (DMTF) --.

Claim 14, Column 14, Line 19, the word "using" should read -- with --.

Signed and Sealed this
Sixteenth Day of June, 2020

Andrei Iancu
*Director of the United States Patent and Trademark Office*